(12) United States Patent
Haramoto et al.

(10) Patent No.: US 10,988,093 B2
(45) Date of Patent: Apr. 27, 2021

(54) VEHICULAR STATIC ELIMINATING DEVICE AND VEHICLE

(71) Applicants: TOYOTA JIDOSHA KABUSHIKI KAISHA, Toyota (JP); DENSO CORPORATION, Kariya (JP); Sharp Kabushiki Kaisha, Sakai (JP)

(72) Inventors: Yasutake Haramoto, Toyota (JP); Kazuhiro Maeda, Toyota (JP); Koushi Yamada, Toyota (JP); Kazushi Shikata, Kariya (JP); Kahori Ishida, Kariya (JP); Yasutaka Kataoka, Sakai (JP)

(73) Assignees: SHARP KABUSHIKI KAISHA, Sakai (JP); TOYOTA JIDOSHA KABUSHIKI KAISHA, Aichi (JP); DENSO CORPORATION, Aichi (JP)

( * ) Notice: Subject to any disclaimer, the term of this patent is extended or adjusted under 35 U.S.C. 154(b) by 174 days.

(21) Appl. No.: 16/504,369

(22) Filed: Jul. 8, 2019

(65) Prior Publication Data
US 2020/0010036 A1    Jan. 9, 2020

(30) Foreign Application Priority Data
Jul. 9, 2018  (JP) .............. JP2018-130179

(51) Int. Cl.
| | |
|---|---|
| B60R 16/06 | (2006.01) |
| B60K 13/02 | (2006.01) |
| F02M 35/10 | (2006.01) |
| H01T 19/00 | (2006.01) |
| H05F 3/06 | (2006.01) |

(52) U.S. Cl.
CPC .............. *B60R 16/06* (2013.01); *B60K 13/02* (2013.01); *F02M 35/10242* (2013.01); *H01T 19/00* (2013.01); *H05F 3/06* (2013.01)

(58) Field of Classification Search
CPC ... F02M 35/10242; H01T 19/00; H01T 19/04; H01T 23/00; H05F 3/06; B60R 13/02; B60R 16/06
USPC ...................................................... 361/217
See application file for complete search history.

(56) References Cited

U.S. PATENT DOCUMENTS

| | | |
|---|---|---|
| 5,456,741 A | 10/1995 | Takahara et al. |
| 2009/0001787 A1 | 1/2009 | Lawall et al. |
| 2014/0197332 A1 | 7/2014 | Kataoka |
| 2016/0108868 A1 | 4/2016 | Tanahashi et al. |
| 2016/0264192 A1 | 9/2016 | Tanahashi et al. |

(Continued)

FOREIGN PATENT DOCUMENTS

| | | |
|---|---|---|
| JP | 6128093 B2 | 5/2017 |
| JP | 6217675 B2 | 10/2017 |

*Primary Examiner* — Kevin J Comber
(74) *Attorney, Agent, or Firm* — Keating & Bennett, LLP

(57) ABSTRACT

A vehicular static eliminating device includes: a negative ion generating device; and a guide device configured to guide negative ions and release the negative ions from an emission port to a static elimination target spot which is positively charged, the guide device including: a guide member defining a passage through which to guide the negative ions, the guide member being made of a resin which is easily negatively charged in a triboelectric series; and a tip-shaped part configured to discharge, by corona discharge, negative electric charges, which have accumulated on the guide member, to the static elimination target spot, the tip-shaped part being provided in a part defining the emission port and in proximity to the static elimination target spot.

12 Claims, 13 Drawing Sheets

(56) References Cited

U.S. PATENT DOCUMENTS

2016/0280162 A1    9/2016   Yamada et al.
2017/0197219 A1    7/2017   Guthrie

VEHICULAR STATIC ELIMINATING DEVICE AND VEHICLE

This Nonprovisional application claims priority under 35 U.S.C. § 119 on Patent Application No. 2018-130179 filed in Japan on Jul. 9, 2018, the entire contents of which are hereby incorporated by reference.

TECHNICAL FIELD

The present invention relates to (i) a vehicular static eliminating device (static eliminating device for a vehicle) to be provided in a vehicle and (ii) a vehicle.

BACKGROUND ART

It is conventionally known (i) that positive static electric charges accumulate on a vehicle by an external factor including a vehicle body traveling on a road surface from which the vehicle body is insulated and (ii) that the positive static electric charges which have accumulated on the vehicle have some influence on driving of the vehicle. For example, Patent Literatures 1 and 2 each disclose a technique serving as a countermeasure against such positive static electric charges which accumulate on a vehicle.

Patent Literature 1 discloses a configuration in which negative ions are emitted from a charge control device to a back wall surface of a part of a body outer wall of a vehicle, the part having a shape which makes it easy for air flowing along the body outer wall to be separated from the body outer wall, so that positive electric charges of the part are reduced or the part is negatively charged. The configuration allows aerodynamic characteristics required from the viewpoint of design to be achieved by restraining an airflow flowing along the body outer wall of the vehicle and having positive electric charges from being separated from the body outer wall.

Patent Literature 2 discloses a configuration in which a self-discharge static eliminator for ionization of air (i) is provided on an outer wall surface of an intake air passage wall made of resin and defining an intake air passage of a driving force generating device of a vehicle and (ii) decreases a positive electrification charge amount within a limited range around a part of the positively-charged intake air passage wall in which part the self-discharge static eliminator is placed. The configuration makes it possible to restrain an airflow flowing through the intake air passage and positively charged from being separated from the intake air passage wall, and consequently to take in intake air with higher efficiency.

CITATION LIST

Patent Literatures

[Patent Literature 1]
Specification of Japanese Patent No. 6217675
[Patent Literature 2]
Specification of Japanese Patent No. 6128093

SUMMARY OF INVENTION

Technical Problem

Patent Literatures 1 and 2 described above are each intended to eliminate or reduce an influence by positive static electricity with which a vehicle is charged. Note, however, that Patent Literatures 1 and 2 each still have room for improvement.

An object of an aspect of the present invention is to achieve a vehicular static eliminating device and a vehicle each capable of more effectively eliminating static electricity from a static elimination target spot so as to more effectively eliminate or reduce an influence by static electricity with which the vehicle is charged.

Solution to Problem

In order to attain the object, a vehicular static eliminating device in accordance with an aspect of the present invention is (i) provided in a vehicle on which positive static electric charges accumulate by, for example, an external factor including travel of a vehicle body which is insulated from a road surface and (ii) configured to eliminate static electricity from a static elimination target spot in the vehicle, the static elimination target spot being predetermined and positively charged, or to negatively charge the static elimination target spot, the vehicular static eliminating device including: a negative ion generating section; and a guide device configured to guide negative ions generated by the negative ion generating section, and release the negative ions from an emission port to the static elimination target spot, the guide device including: a guide member defining a passage through which to guide the negative ions, the guide member being made of a resin which is easily negatively charged in a triboelectric series; and a tip-shaped part configured to discharge, by corona discharge, negative electric charges, which have accumulated on the guide member, to the static elimination target spot, the tip-shaped part being provided in a part defining the emission port and in proximity to the static elimination target spot.

Advantageous Effects of Invention

An aspect of the present invention makes it possible to more effectively eliminate static electricity from a positively charged static elimination target spot and thus makes it possible to more effectively eliminate or reduce an influence by positive static electricity with which a vehicle is charged.

Figure 1:
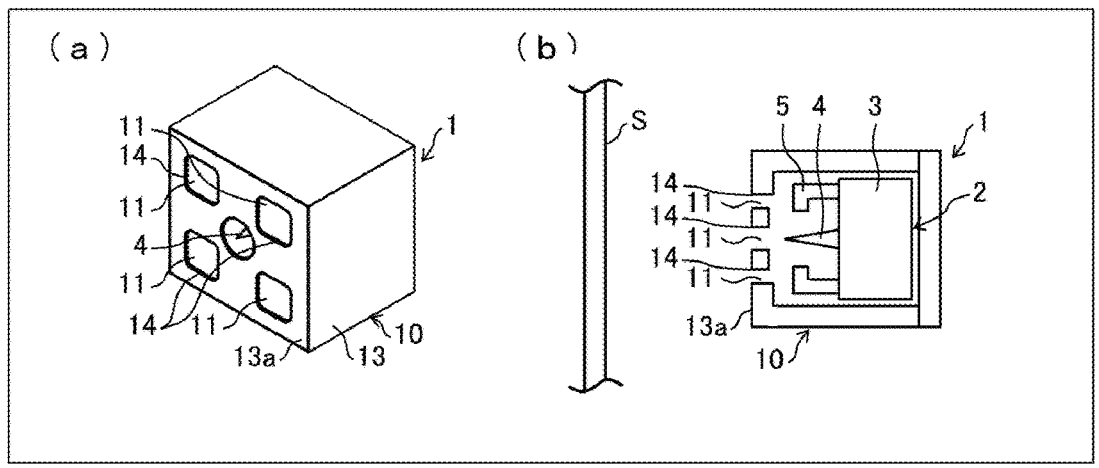
FIG. 1 illustrates a vehicular static eliminating device in accordance with Embodiment 1 of the present invention. (a) of FIG. 1 is a view illustrating an appearance of the vehicular static eliminating device. (b) of FIG. 1 is a cross-sectional view schematically illustrating a configuration of the vehicular static eliminating device.
Figure 20:
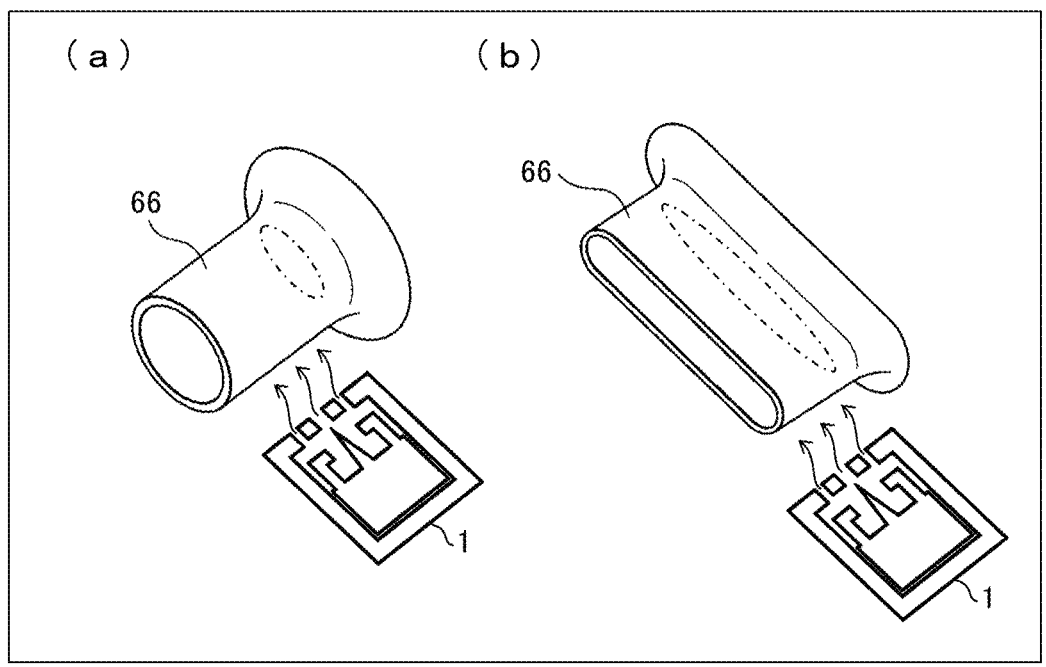

(a) and (b) of FIG. 20 are each an explanatory view illustrating (i) an intake air introduction pipe to an air cleaner, which is a part of an air intake device of a driving force generating device of a vehicle and (ii) the vehicular static eliminating device illustrated in FIG. 1 and provided near the intake air introduction pipe so as to be in proximity to the intake air introduction pipe.

DESCRIPTION OF EMBODIMENTS

Embodiment 1

An embodiment of the present invention is specifically described below.

(Configuration of Vehicular Static Eliminating Device 1)

FIG. 1 illustrates a vehicular static eliminating device 1 in accordance with Embodiment 1 of the present invention. (a) of FIG. 1 is a view illustrating an appearance of the vehicular static eliminating device 1. (b) of FIG. 1 is a cross-sectional view schematically illustrating a configuration of the vehicular static eliminating device 1. Note that (b) of FIG. 1 also illustrates a static elimination target spot S. As illustrated in (a) and (b) of FIG. 1, the vehicular static eliminating device 1 includes a negative ion generating device (negative ion generating section) 2 and a guide device 10 including no air blowing device.

The negative ion generating device 2 is a device configured to generate negative ions. The negative ion generating device 2 has a housing 3 provided with a projecting needle-like discharge electrode 4. Around the discharge electrode 4, a counter electrode 5 is provided. The discharge electrode 4 forms an electric field between the discharge electrode 4 and the counter electrode 5, and negative ions are generated from a tip of the discharge electrode 4. FIG. 1 shows a needle-like electrode as an example of the discharge electrode 4. Note, however, that the discharge electrode 4 can alternatively be a brush-like electrode or a triangular electrode. The housing 3 houses therein a discharge substrate (not illustrated) configured to control the discharge electrode 4 and the counter electrode 5. The discharge substrate is connected with a main substrate 30 described later (see FIG. 3).

The guide device 10 guides negative ions generated by the negative ion generating device 2 and releases the negative ions from emission ports 11 toward the static elimination target spot S. The guide device 10 includes a guide member 13 and tip-shaped parts 14.

The guide member 13 defines a passage for negative ions and has, on a front wall 13a thereof provided on a downstream side in a direction in which the negative ions flow, a plurality of openings serving as the emission ports 11 of the guide device 10. According to the configuration of Embodiment 1, since the openings of the guide member 13 serve as the emission ports 11 of the guide device 10, those openings may also be expressed as the emission ports 11 of the guide member 13. FIG. 1 illustrates the guide member 13 which is configured to have a cube-shaped appearance. Note, however, that the guide member 13 can be, for example, cylindrical or hexagonal column-shaped.

Figure 2:
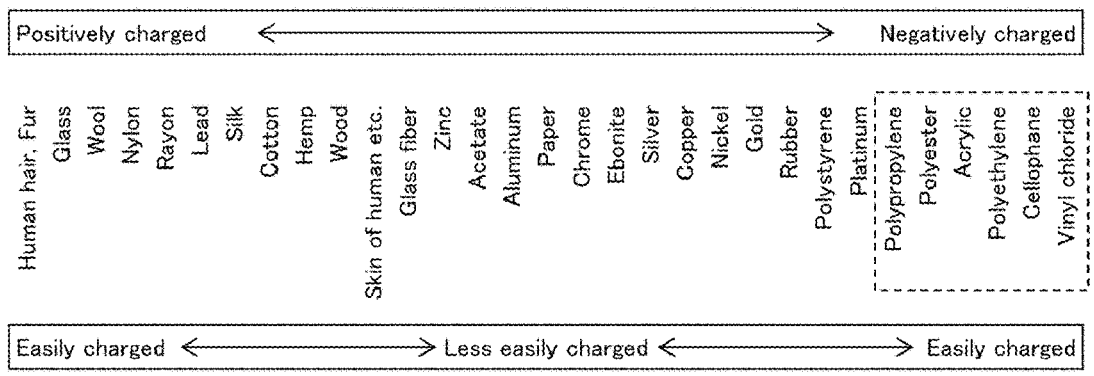
FIG. 2 is a view showing a triboelectric series of typical materials.

The guide member 13 is made of a resin which is easily negatively charged in such a triboelectric series as illustrated in FIG. 2, such as acrylonitrile butadiene styrene (ABS) or polypropylene (PP). FIG. 2 is a view showing a triboelectric series of typical materials. Resins which are easily negatively charged refer to resins enclosed by a broken line in FIG. 2 and including polypropylene (PP) and resins located on the right side of polypropylene (PP). The guide member 13 which is made of a resin which is easily negatively charged is negatively charged and retains negative electric charges.

The tip-shaped parts 14 are provided (i) in parts defining the emission ports 11 and (ii) in proximity to the static elimination target spot S. The expression "provided in proximity" is rephrased as follows. Specifically, the tip-shaped parts 14 are positioned relative to the static elimination target spot S so that the tip-shaped parts 14 can discharge, by corona discharge, negative electric charges, which have accumulated on the guide member 13, to the static elimination target spot S which is more positively charged than the tip-shaped parts 14. This allows the tip-shaped parts 14 to discharge, by corona discharge, negative electric charges, which have accumulated on the guide member 13, to the static elimination target spot S which is positively charged.

Each of the tip-shaped parts 14 (i) has a tip such as a protrusion, a corner, or a point and (ii) has a shape which easily causes corona discharge. In a case where the tip-shaped parts 14 each of which has such a shape are provided around the emission ports 11, negative electric charges supported by the guide member 13 can be discharged, by corona discharge, from points of the tip-shaped parts 14 to the static elimination target spot S. Specifically, since the static elimination target spot S is positively charged, by bringing the tip-shaped parts 14 into proximity to the static elimination target spot S, negative electric charges accumulating on the guide member 13 are attracted to positive electric charges of the static elimination target spot S, so that corona discharge occurs. In FIG. 1, corners of parts defining the emission ports 11 (edge parts of the emission ports 11) are pointed. These pointed corners serve as the tip-shaped parts 14.

FIG. 1 illustrates a configuration in which the negative ion generating device 2 is provided inside the guide member 13. Note, however, that the negative ion generating device 2 can be connected with the guide member 13 so that negative ions generated by the negative ion generating device 2 can be supplied to inside the guide member 13.

Note, however, that according to the guide device 10 which is configured to include no air blowing device, by making a distance from the tip of the discharge electrode 4 to the front wall 13a shorter, it is possible to achieve a wider range of static elimination carried out by negative ions released from the emission ports 11. Thus, the distance from the tip of the discharge electrode 4 to the front wall 13a is preferably, for example, 10 mm to 30 mm.

Figure 3:
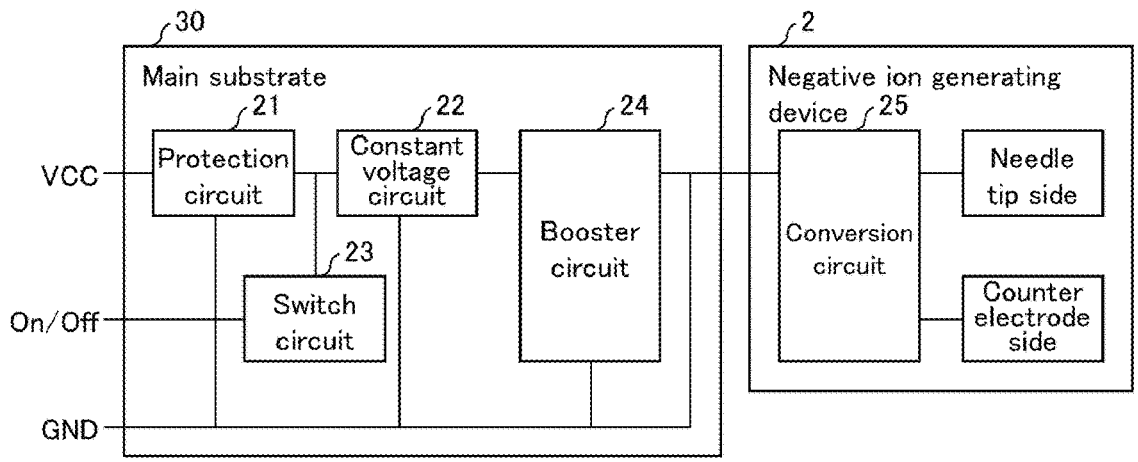
FIG. 3 is a circuit diagram illustrating an electric circuit configuration of the vehicular static eliminating device illustrated in FIG. 1.

FIG. 3 is a circuit diagram illustrating an electric circuit configuration of the vehicular static eliminating device 1. In FIG. 3, a protection circuit 21, a constant voltage circuit 22, a switch circuit 23, and a booster circuit 24 are provided on the main substrate 30. A conversion circuit 25 is provided on the discharge substrate described earlier. The conversion circuit 25 can alternatively be provided on the main substrate 30.

In a case where an on/off signal is turned on in response to power-on, a voltage supplied from the constant voltage circuit 22 is applied to the conversion circuit 25 via the booster circuit 24. Then, a given voltage is applied from the conversion circuit 25 to each of the discharge electrode 4 and the counter electrode 5, so that negative ions are generated from the tip of the discharge electrode 4.

FIG. 3 illustrates a configuration in which a single negative ion generating device 2 is connected to the main substrate 30. Note, however, that, in a case where a plurality of vehicular static eliminating devices 1 are placed, a plurality of negative ion generating devices 2 are connected to the main substrate 30.

(Static Elimination Operation of Vehicular Static Eliminating Device 1)

Figure 4:
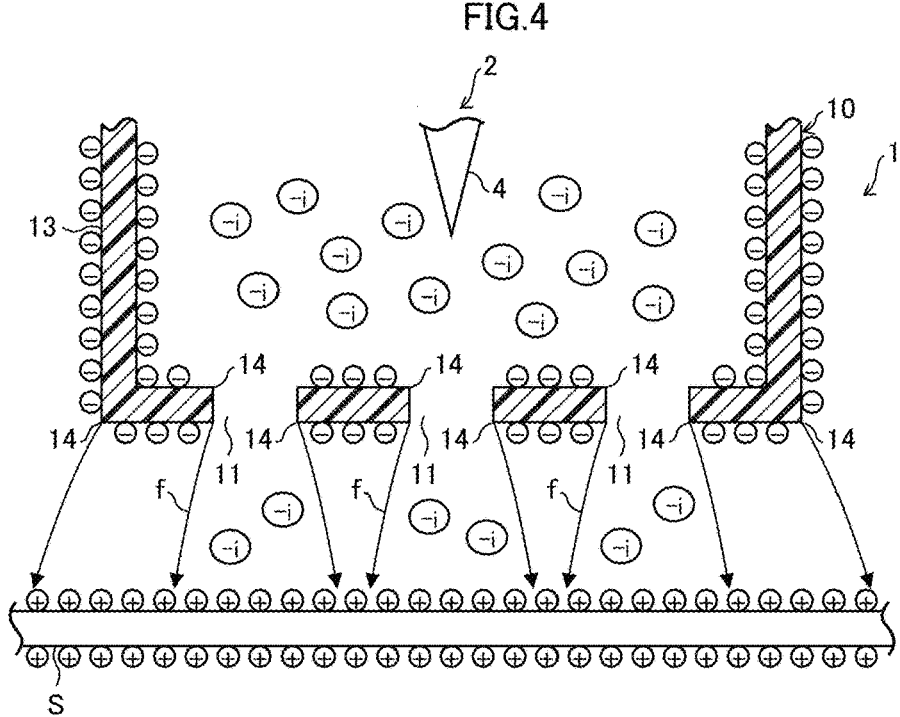
FIG. 4 is a view describing a static elimination operation carried out in the vehicular static eliminating device illustrated in FIG. 1.

FIG. 4 is a view describing a static elimination operation carried out in the vehicular static eliminating device 1. As illustrated in FIG. 4, in a case where negative ions ("-i" in FIG. 4) are generated from the tip of the discharge electrode 4, the negative ions generated are guided to the emission ports 11 by the guide member 13 of the guide device 10 and released from the emission ports 11 to the static elimination target spot S. The negative ions released neutralize positive electric charges, accumulating on the static elimination target spot S, so as to eliminate static electricity from the static elimination target spot S or to negatively charge the static elimination target spot S.

Furthermore, according to the configuration, since the guide member 13 is made of a resin which is easily negatively charged, negative electric charges ("-" in FIG. 4) accumulate on the guide member 13. Negative electric charges having accumulated on the guide member 13 are attracted to positive electric charges ("+" in FIG. 4) accumulating on the static elimination target spot S, so that corona discharge (arrows f) occurs from the tip-shaped parts 14 which are in proximity to the static elimination target spot S. As compared with static elimination carried out with use of only negative ions, occurrence of such discharge as described above allows more positive static electricity to be eliminated from the static elimination target spot S and consequently allows static elimination to be more effectively carried out with respect to the static elimination target spot S. In addition, occurrence of such discharge as described above greatly reduces negative electric charges of the emission ports 11 of the guide member 13. This makes it possible to rectify a problem of prevention of release of negative ions due to the negative ions remaining in the emission ports 11 of the guide member 13, so that the negative ions can be stably released. Thus, it is also possible to negatively charge the static elimination target spot S by neutralizing static electricity on the static elimination target spot S.

(Distance at which Vehicular Static Eliminating Device 1 and Static Elimination Target Spot S Are Spaced)

Negative ions have the highest concentration near the emission ports 11 and have a lower concentration as the negative ions are away from the emission ports 11. A static elimination capability of negative ions depends on a concentration of negative ions to be released. Thus, the emission ports 11 which are provided closer to the static elimination target spot S allow negative ions to more effectively carry out static elimination.

Furthermore, corona discharge, which occurs in the tip-shaped parts 14, more easily occurs in a case where the tip-shaped parts 14 are closer to the static elimination target spot S. Thus, in a case where the emission ports 11 provided with the tip-shaped parts 14 are provided closer to the static elimination target spot S, it is possible to more effectively cause corona discharge. With the configuration, it is possible to (i) effectively carry out static elimination with respect to the static elimination target spot S by corona discharge and (ii) stably release negative ions by an effect, brought about by corona discharge, of rectifying a problem of prevention of release of negative ions.

Note, however, that corona discharge has a limit of occurrence. In a case where the shortest distance at which respective centers of the emission ports 11 and the static elimination target spot S are spaced is more than 100 mm, corona discharge does not occur. Thus, the shortest distance at which the respective centers of the emission ports 11 and the static elimination target spot S are spaced needs to be not more than 100 mm, which is the limit of occurrence of corona discharge. Note here that the following distance is defined as the shortest distance between the respective centers of the emission ports 11 and the static elimination target spot S. As described in embodiments following Embodiment 1 and FIG. 9, the distance thus defined includes, for example, a case where the emission ports 11 are provided so as to be inclined with respect to the static elimination target spot S.

The distance is most preferably 20 mm. The distance which is 20 mm brings about the greatest static elimination effect. This makes it possible to more greatly reduce a positive electric potential of the static elimination target spot S, so that the positive electric potential can be made closer to zero or a negative electric potential lower than zero.

A static elimination effect is reduced as the distance is away from a peak of 20 mm. Specifically, in a case where the distance is not more than 100 mm, a static elimination effect is enhanced because an effect, brought about by corona discharge, of rectifying a problem of prevention of release of negative ions (also referred to as a "corona discharge effect") allows negative ions to be released in a larger amount as the distance is closer to 20 mm.

Note, however, that, in a case where the respective centers of the emission ports 11 and the static elimination target spot S are spaced at a distance of less than 20 mm, a corona discharge effect continues to be enhanced, whereas a static elimination effect starts to be gradually reduced. This is because the emission ports 11 are made too close to the static elimination target spot S. Specifically, a distance of less than 20 mm at which the respective centers of the emission ports 11 and the static elimination target spot S are spaced is resistant to release of negative ions. This causes negative ions to be released in a smaller amount. Furthermore, in a case where the emission ports 11 are made too close to the static elimination target spot S, a range of release of negative ions (a range of access by negative ions in which range the negative ions carry out an activity) is also narrowed.

Thus, the distance which is 20 mm makes it possible to bring about the greatest static elimination effect while most perfectly balancing a corona discharge effect and a range of release of negative ions with each other.

It has been confirmed that the distance is most preferably 20 mm. Note, however, that it has also been confirmed that the distance which falls within the range of 20(±2) mm (i.e., 18 mm to 22 mm) effectively achieves the effect described earlier. Thus, the distance which falls within the range of 18 mm to 22 mm makes it possible to bring about a great static elimination effect.

Note that the inventors of the present invention have confirmed that a phenomenon such that a static elimination effect starts to be gradually reduced in a case where the respective centers of the emission ports 11 and the static elimination target spot S are spaced at a distance of less than 20 mm occurs not only in a type including no air blowing device (e.g., the vehicular static eliminating device 1) but also in a type including an air blowing device (e.g., a vehicular static eliminating device 6 described later (see FIG. 10)).

Figure 5:
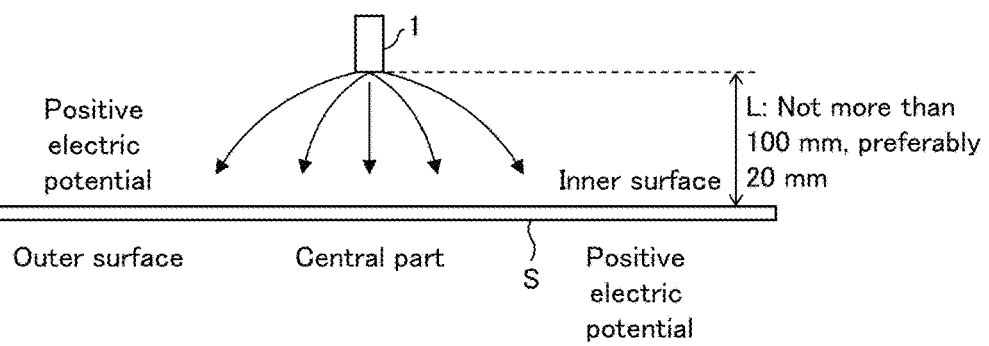
FIG. 5 illustrates a static elimination range in a case where the vehicular static eliminating device illustrated in FIG. 1 is provided so as to face a static elimination target spot. (a) of FIG. 5 is a lateral view of the static elimination range. (b) of FIG. 5 is a plan view of the static elimination range.
Figure 5:
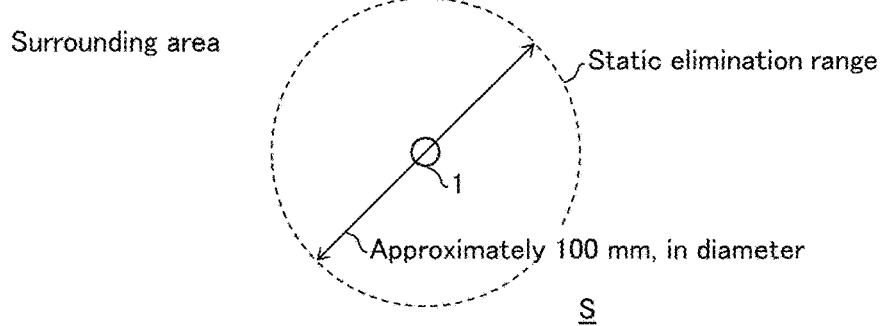

FIG. 5 illustrates a static elimination range in a case where the vehicular static eliminating device 1 is provided so as to face the static elimination target spot S. (a) of FIG. 5 is a lateral view of the static elimination range. (b) of FIG. 5 is a plan view of the static elimination range. As illustrated in (a) and (b) of FIG. 5, the static elimination range is a limited circular range whose center is a location at which the vehicular static eliminating device 1 is placed. From the static elimination target spot S included in the above static elimination range, static electricity is eliminated. In order to achieve a static elimination range whose diameter is approximately 100 mm, it is preferable to provide the vehicular static eliminating device 1 so that the vehicular static eliminating device 1 is in proximity to the static elimination target spot S.

(Example of How Vehicular Static Eliminating Device 1 is Placed)

Figure 6:
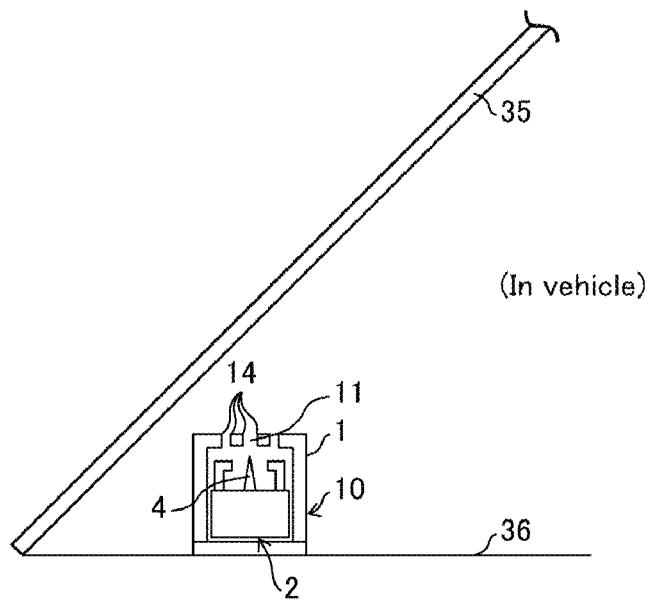
FIG. 6 is a view showing an example of how the vehicular static eliminating device illustrated in FIG. 1 is placed with respect to vehicle glass.

FIG. 6 is a view showing an example of how the vehicular static eliminating device 1 is placed with respect to vehicle glass 35. The vehicle glass 35 is, for example, a windshield, side glass, or rear glass. A placement surface 36 on which the vehicular static eliminating device 1 is placed is a plate-like design component such as a dashboard, a front pillar, a rear pillar, or an inner panel of a side door.

As illustrated in FIG. 6, the vehicular static eliminating device 1 is placed so that (i) the tip of the discharge electrode 4 extends from inside a vehicle body toward a peripheral edge part of the vehicle glass 35 and (ii) a direction in which the discharge electrode 4 protrudes is inclined with respect to the vehicle glass 35. The vehicular static eliminating device 1, which is configured to include no air blowing device and is small in size, provides a feeling of strangeness in a case where the vehicular static eliminating device 1 is placed in the vehicle so that the discharge electrode 4 is provided so as to face the front of the vehicle glass 35. In contrast, in a case where the discharge electrode 4 is provided so as to be inclined with respect to the vehicle glass 35 as illustrated in FIG. 6, the vehicular static eliminating device 1 can be placed in the vehicle without a feeling of strangeness.

Figure 7:
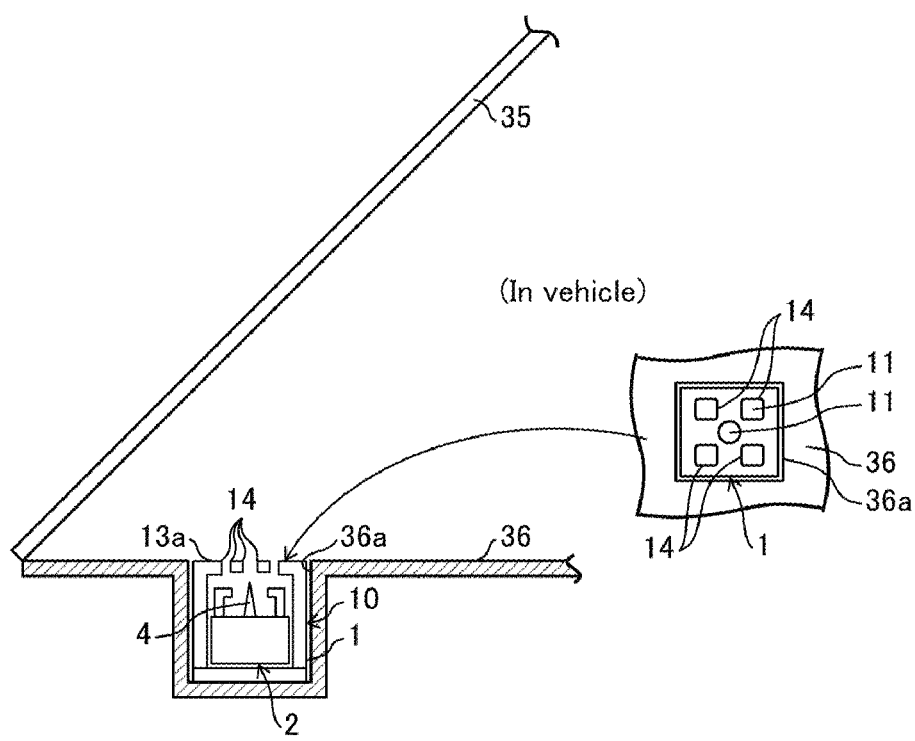
FIG. 7 is a view showing another example of how the vehicular static eliminating device illustrated in FIG. 1 is placed with respect to vehicle glass.

FIG. 7 is a view showing another example of how the vehicular static eliminating device 1 is placed with respect to the vehicle glass 35. As illustrated in FIG. 7, the placement surface 36 is provided with a recess 36a which is made to fit external dimensions of the vehicular static eliminating device 1, and the vehicular static eliminating device 1 is embedded in the recess 36a so that the placement surface 36 and the front wall 13a are flush with each other.

Figure 8:
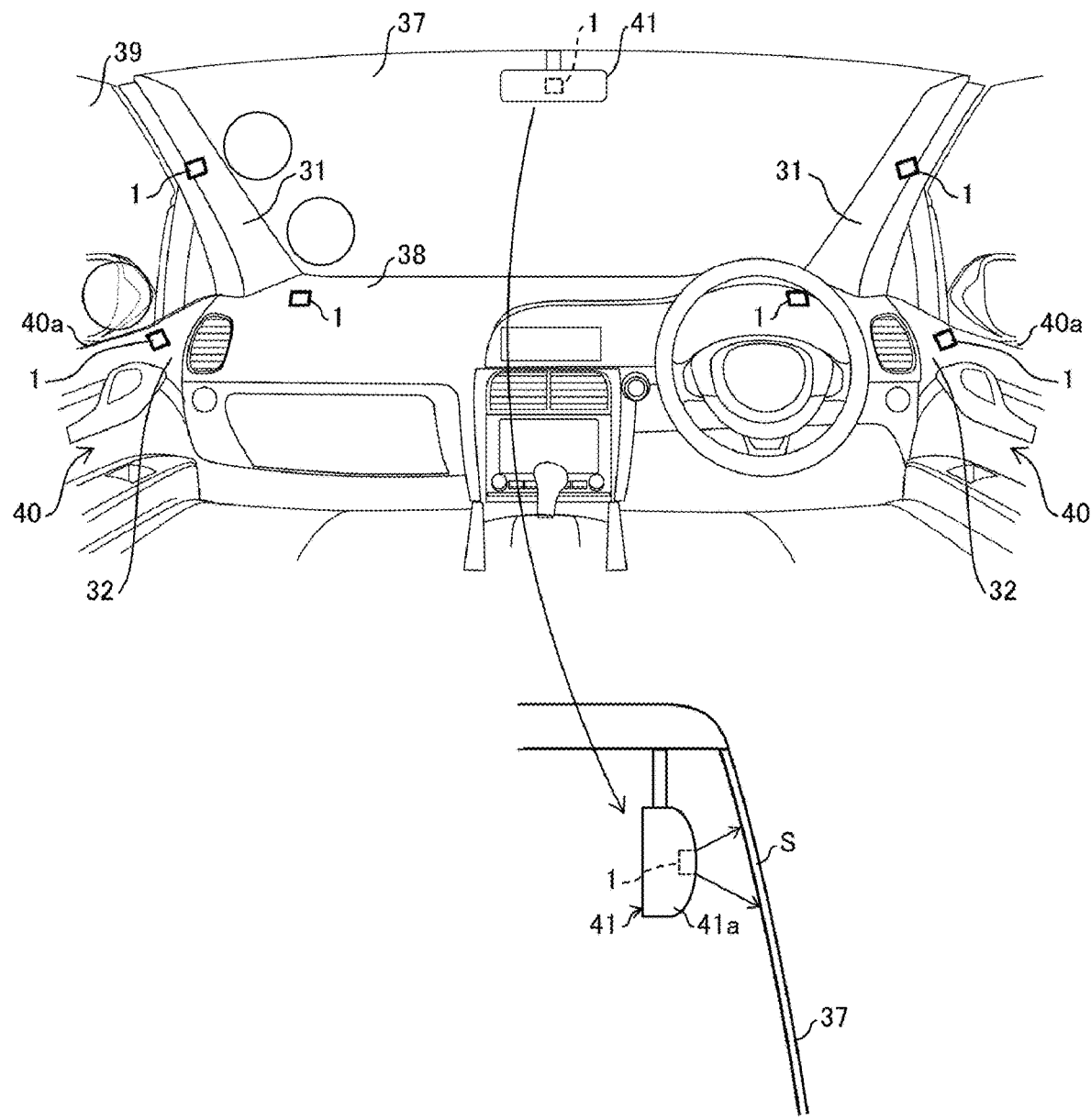
FIG. 8 is a view showing an example of a place at which to place the vehicular static eliminating device illustrated in FIG. 1.

FIG. 8 is a view showing an example of a place at which to place the vehicular static eliminating device 1. In order that static electricity is eliminated from a peripheral edge part of a windshield 37, the vehicular static eliminating device 1 includes vehicular static eliminating devices 1 placed at respective right and left corners of a dashboard 38 and vehicular static eliminating devices 1 placed on respective right and left front pillars 31. In order that static electricity is eliminated from a peripheral edge part of side glass 39, the vehicular static eliminating device 1 further includes vehicular static eliminating devices 1 which are placed on respective inner panels 32 of right and left side doors 40 and on the front side in a traveling direction of the vehicle on respective lower end sides of openings 40a. The vehicular static eliminating device 1 further includes a vehicular static eliminating device 1 which is placed inside a cover 41a of a rearview mirror 41 so as to be in proximity to the windshield 37 while facing an upper part of a center of the windshield 37.

The vehicular static eliminating device 1 can include, in addition to the above vehicular static eliminating devices 1, a vehicular static eliminating device 1 placed on a roof (not illustrated), a vehicular static eliminating device 1 placed on rear window glass (not illustrated), a vehicular static eliminating device 1 placed on a center pillar (not illustrated), a vehicular static eliminating device 1 placed in a grip part of a door handle (not illustrated), and/or a vehicular static eliminating device 1 placed in a bent part of an undercover (not illustrated).

A vehicle is charged with positive static electricity by, for example, (i) an external factor including a vehicle body traveling (ii) and the vehicle body being insulated from a road surface by a wheel made of an insulating material.

(Confirmatory Experiment on Static Elimination)

Figure 9:
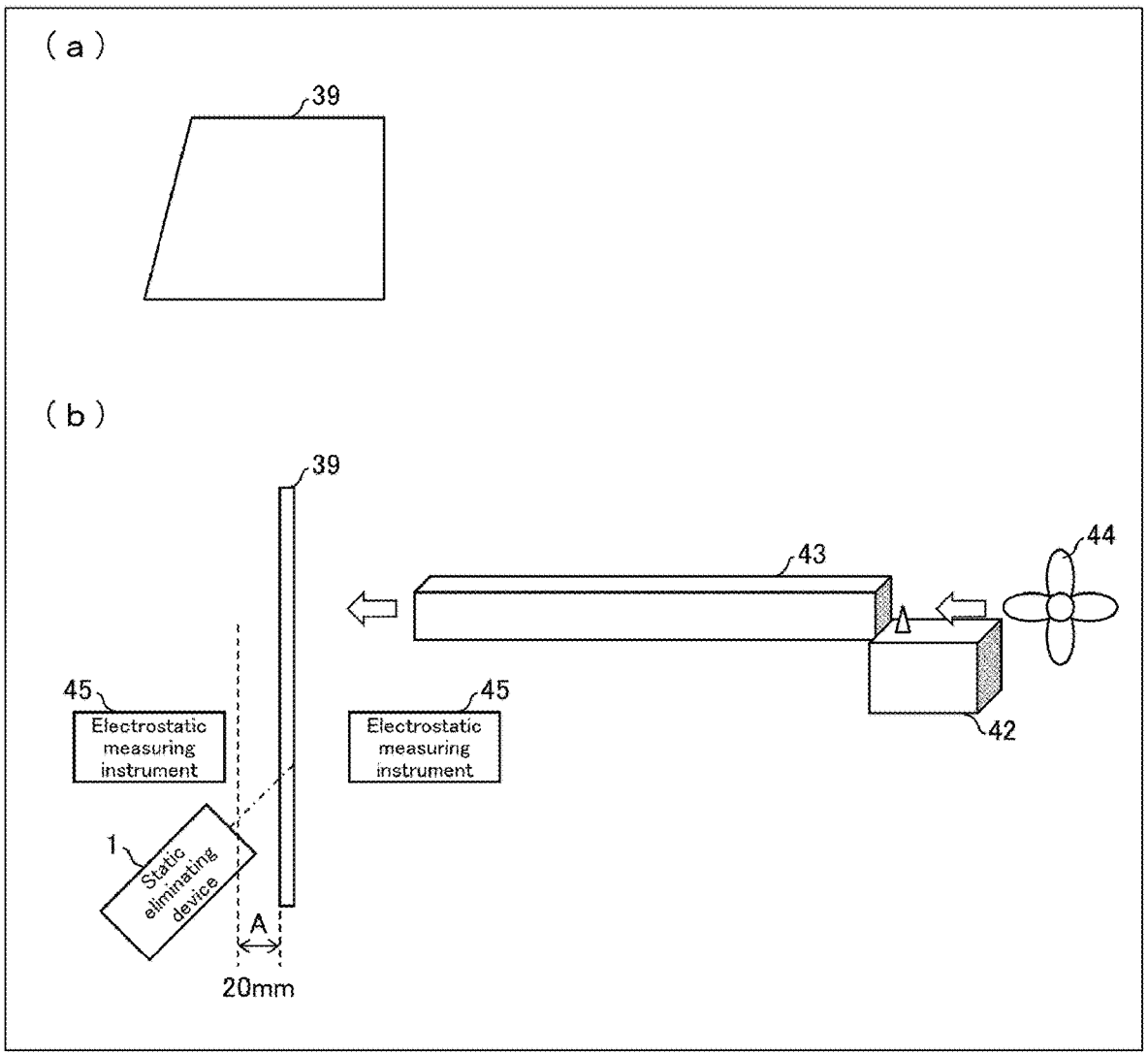
FIG. 9 illustrates a confirmatory experiment on a static elimination effect. (a) of FIG. 9 illustrates the shape of vehicle glass used in the confirmatory experiment. (b) of FIG. 9 is a configuration diagram schematically illustrating an experimental system used to carry out the confirmatory experiment.

The following description discusses a confirmatory experiment on a static elimination effect, the confirmatory experiment having been carried out by reproducing an environment in which vehicle glass is constantly positively charged. FIG. 9 illustrates a confirmatory experiment on a static elimination effect. (a) of FIG. 9 illustrates the shape of vehicle glass used in the confirmatory experiment. (b) of FIG. 9 is a configuration diagram schematically illustrating an experimental system used to carry out the confirmatory experiment.

As illustrated in (a) of FIG. 9, the vehicle glass was the side glass 39 having a thickness t of 3 mm and having a shape of a trapezoid having an upper side of 600 mm, a lower side of 800 mm, and a height of 465 mm. Such side glass 39 was placed in the experimental system illustrated in (b) of FIG. 9. In the experimental system, two electrostatic measuring instruments 45 (Electrostatic Fieldmeter FMX-004 (manufactured by SIMCO)) were provided so that a speed of static elimination carried out on each of a front surface and a back surface of the side glass 39 was measurable. The electrostatic measuring instruments 45 each carried out measurement at a location 100 mm away from a lower end of a peripheral edge part of the side glass 39. Furthermore, on a side on which one of the electrostatic measuring instruments 45, which one was used to carry out measurement with respect to the front surface of the side glass 39, was located, a positive ion generating device 42 and a fan 44 were provided via a paper duct 43.

By using such an experimental system and adjusting a wind velocity of the fan 44, an environment was created in which the front surface and the back surface of the side glass 39 are constantly charged in an amount of +1 kV to +2 kV. Even in a case where an amount of ions generated by the positive ion generating device 42 and the wind velocity of the fan 44 are constant, an amount of positive static electric charges which accumulate on the side glass 39 varies depending on, for example, a type, the thickness, and/or the size, and an amount in which a place in the side glass 39, which place is different from a location of measurement, is charged also varies.

Furthermore, it was confirmed that, in a case where the positive ion generating device 42 is turned off while the front surface and the back surface of the side glass 39 are constantly charged in an amount of +1 kV to +2 kV, an amount in which the side glass 39 is charged reaches approximately zero after the elapse of approximately 60 seconds from the turning-off of the ion generating device 42 by leaving the ion generating device 42 as it is (a condition on which the confirmatory experiment is premised was confirmed in advance).

After thus confirming the condition on which the confirmatory experiment is premised, the vehicular static eliminating device 1 was placed at a distance of 20 mm from the back surface of the side glass 39, whose front surface and back surface were constantly charged in an amount of +1 kV to +2 kV, while a direction in which the discharge electrode 4 inside the vehicular static eliminating device 1 protrudes was inclined at 45° with respect to a surface of the side glass 39. The vehicular static eliminating device 1 thus placed was turned on, and then an amount in which the front surface and the back surface of the side glass 39 were charged while the vehicular static eliminating device 1 was being on was determined. The vehicular static eliminating device 1 was placed so that (i) a line extending from the tip of the discharge electrode 4 and indicated by a dotted and dashed line in FIG. 9 and (ii) a line connecting the electrostatic measuring instruments 45 intersected each other in the side glass 39.

An amount in which the front surface and the back surface of the side glass 39 were charged was changed from approximately 0 to −1.0 kV. Then, in a case where the vehicular static eliminating device 1 was turned off, the amount was reset to an initial value of +1 kV to +2 kV after the elapse of approximately 60 seconds from the turning-off of the vehicular static eliminating device 1. Furthermore, it was confirmed that, in a case where, while the front surface and the back surface of the side glass 39 are constantly charged in an amount of +1 kV to +2 kV, the positive ion generating device 42 is turned off and the vehicular static eliminating device 1 continues to be on, the front surface and the back surface of the side glass 39 are charged in an amount of approximately −1 kV to −1.5 kV. It follows that the static elimination target spot S can also be negatively charged.

Embodiment 2

A further embodiment of the present invention is described below with reference to FIGS. 10 through 12. Note that, for convenience, members having functions identical to those of the respective members described in Embodiment 1 are given respective identical reference signs, and a description of those members is omitted here.

Figure 10:
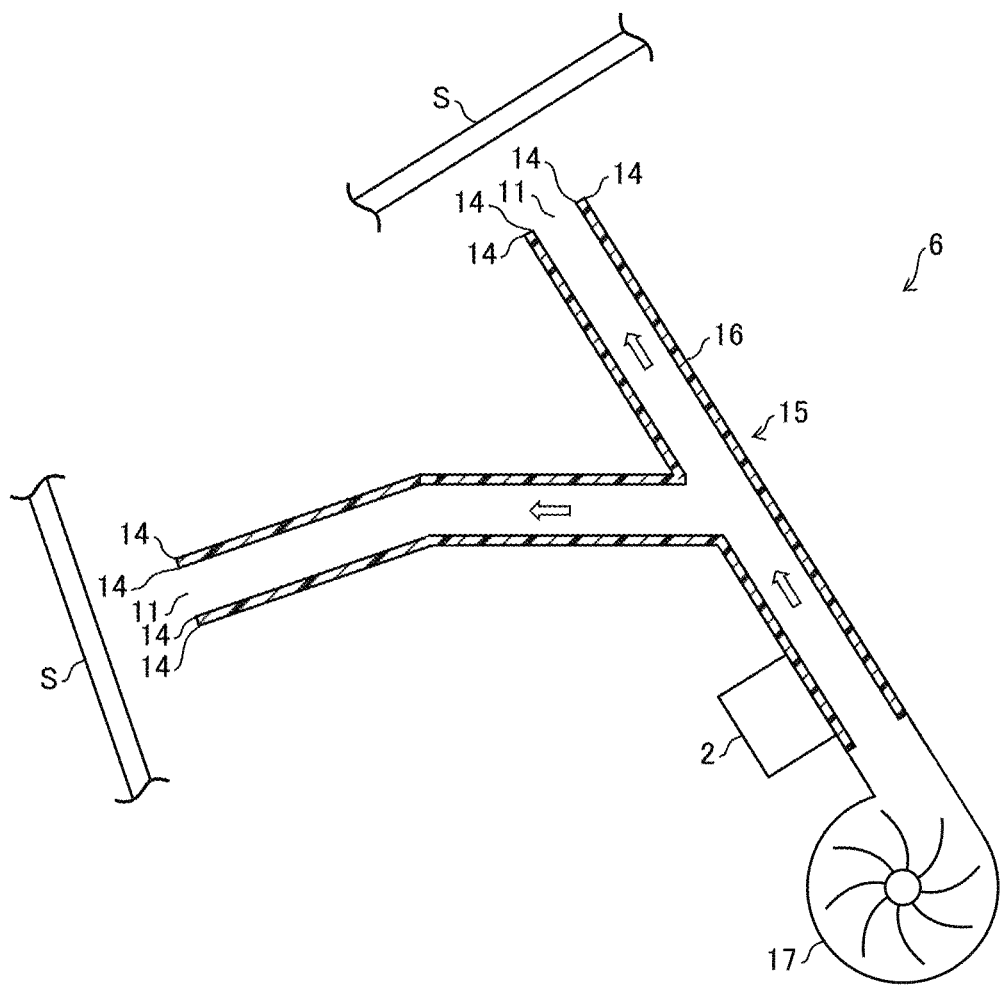
FIG. 10 is a cross-sectional view schematically illustrating a configuration of a vehicular static eliminating device in accordance with Embodiment 2 of the present invention.

FIG. 10 is a cross-sectional view schematically illustrating a configuration of a vehicular static eliminating device 6 in accordance with Embodiment 2 of the present invention. As illustrated in FIG. 10, the vehicular static eliminating device 6 includes a guide device 15 with which the guide device 10 is replaced and which includes an air blowing device 17. The guide device 15 includes a guide pipe (guide member) 16 with which the guide member 13 is replaced.

The guide pipe 16 has (i) an opening which is provided at a first end thereof and to which the air blowing device 17 is connected and (ii) an opening which is provided at a second end thereof and serves as an emission port 11 from which negative ions are released. The guide pipe 16 is provided so as to face a static elimination target spot S. In response to driving of the air blowing device 17, a current of air which flows through the guide pipe 16 to the emission port 11 is produced. FIG. 10 illustrates the guide pipe 16 which is configured to branch into two. Note, however, that the guide pipe 16 can alternatively branch into three or more, or the guide pipe 16 does not need to branch.

A negative ion generating device 2 is connected to the guide pipe 16 so as to allow negative ions generated by the negative ion generating device 2 to be supplied to a current of air flowing through the guide pipe 16. The negative ion generating device 2 can be provided downstream from the air blowing device 17 in a direction in which negative ions flow. Note, however, that, in a case where the guide pipe 16 branches, the negative ion generating device 2 is provided upstream from a place at which the guide pipe 16 branches.

As in the case of the guide member 13, the guide pipe 16 is also made of a resin which is easily negatively charged in a triboelectric series. Corners of a part defining the emission port 11 of the guide pipe 16 are pointed. These pointed corners serve as tip-shaped parts 14.

Figure 11:
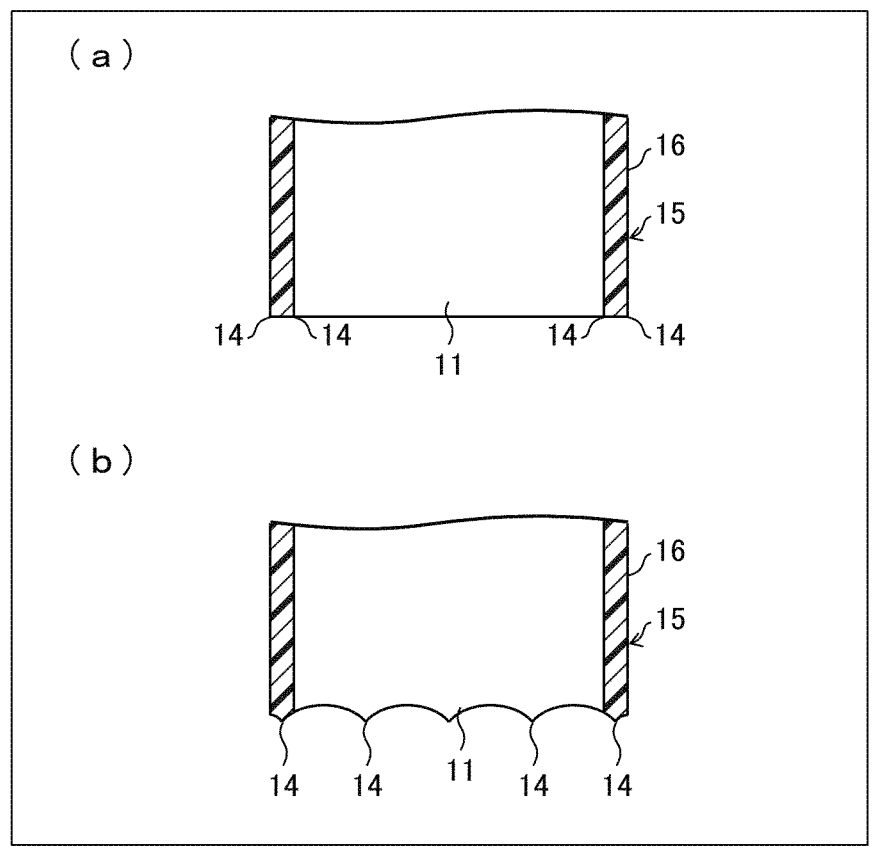
FIG. 11 is an enlarged view of an emission port part of a guide device of the vehicular static eliminating device illustrated in FIG. 10. (a) of FIG. 11 shows an example of tip-shaped parts formed of corners. (b) of FIG. 11 shows an example of tip-shaped parts formed of tips.

FIG. 11 is an enlarged view of an emission port 11 part of the guide device 15 of the vehicular static eliminating device 6. (a) of FIG. 11 shows an example of the tip-shaped parts 14 formed of corners. (b) of FIG. 11 shows an example of the tip-shaped parts 14 formed of tips. As illustrated in (a) of FIG. 11, the tip-shaped parts 14 are formed by giving points to corners of an end surface of an end opening serving as the emission port 11 of the guide pipe 16. As illustrated in (b) of FIG. 11, the tip-shaped parts 14 can alternatively be formed by providing the end surface of the end opening serving as the emission port 11 of the guide pipe 16 with many tips. Though not illustrated in (a) and (b) of FIG. 11, the tip-shaped parts 14 are placed in proximity to the static elimination target spot S.

According to the vehicular static eliminating device 6 thus configured, negative ions generated by the negative ion generating device 2 are guided through the guide pipe 16 to the emission port 11 by a current of air generated by the air blowing device 17, so that the negative ions are released from the emission port 11 to the static elimination target spot S.

Furthermore, in a case where negative electric charges of the guide pipe 16 are discharged, by corona discharge, to the static elimination target spot S which is positively charged, negative electric charges of the emission port 11 of the guide pipe 16 are greatly reduced. This makes it possible to efficiently guide negative ions, blown by the air blowing device 17, to the emission port 11 without causing the negative ions to remain in the guide pipe 16, so that the negative ions can be stably released. In the example of the guide pipe 16 of FIG. 10, negative ions which are being guided to the emission port 11 are divided into two groups in the middle of the guide pipe 16, so that the two groups of negative ions are released to respective two static elimination target spots S.

Figure 12:
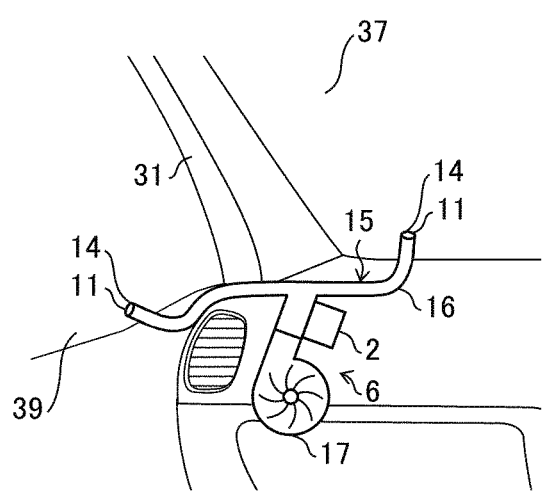
FIG. 12 is a view showing an example of how the vehicular static eliminating device illustrated in FIG. 10 is placed with respect to vehicle glass.

FIG. 12 is a view showing an example of how the vehicular static eliminating device 6 is placed. As illustrated in FIG. 12, the vehicular static eliminating device 6 has two emission ports 11. One of the two emission ports 11 is provided so as to extend from a dashboard 38 toward a peripheral edge part of a windshield 37, and the other of the two emission ports 11 is provided so as to extend from an inner panel 32 of a side door 40 toward a peripheral edge part of side glass 39. Note that the guide pipe 16 can be branched into three so that a third emission port 11 is placed so as to extend from a front pillar 31 toward the peripheral edge part of the windshield 37.

For convenience, FIG. 12 illustrates the vehicular static eliminating device 6 without concealing the vehicular static eliminating device 6 in the dashboard 38 and the inner panel 32 of the side door 40. Note, however, that the vehicular static eliminating device 6 is actually embedded within the dashboard 38 and the inner panel 32 of the side door 40, and only parts of the vehicular static eliminating device 6 in which parts the respective emission ports 11 are provided are exposed from respective openings provided in the dashboard 38 and the inner panel 32 of the side door 40. FIG. 12 merely illustrates a configuration in which the vehicular static eliminating device 6 is provided on the passenger seat side. Note, however, that the vehicular static eliminating device 6 can also be similarly provided on the driver's seat side.

The guide device 15 thus configured to include an air blowing device makes it possible to, without causing generated negative ions to remain in the guide pipe 16, efficiently guide the negative ions to the emission ports 11 and release the negative ions.

Furthermore, corona discharge, which occurs in the tip-shaped parts 14, more easily occurs in a case where the tip-shaped parts 14 are closer to a static elimination target spot S. Thus, in a case where an emission port 11 provided with the tip-shaped parts 14 is provided closer to the static elimination target spot S, it is possible to more effectively cause corona discharge. With the configuration, it is possible to (i) effectively carry out static elimination with respect to the static elimination target spot S by corona discharge and (ii) stably release negative ions by an effect, brought about by corona discharge, of rectifying a problem of prevention of release of negative ions.

In view of the above, the shortest distance between a center of the emission port 11 which is provided with the tip-shaped parts 14 and the static elimination target spot S (distance at which the center of the emission port 11 which is provided with the tip-shaped parts 14 and the static elimination target spot S are spaced) is preferably not more than 100 mm, and more preferably 20 mm.

Embodiment 3

A further embodiment of the present invention is described below with reference to FIGS. 13 and 14. Note that, for convenience, members having functions identical to those of the respective members described in Embodiments 1 and 2 are given respective identical reference signs, and a description of those members is omitted here.

Figure 13:
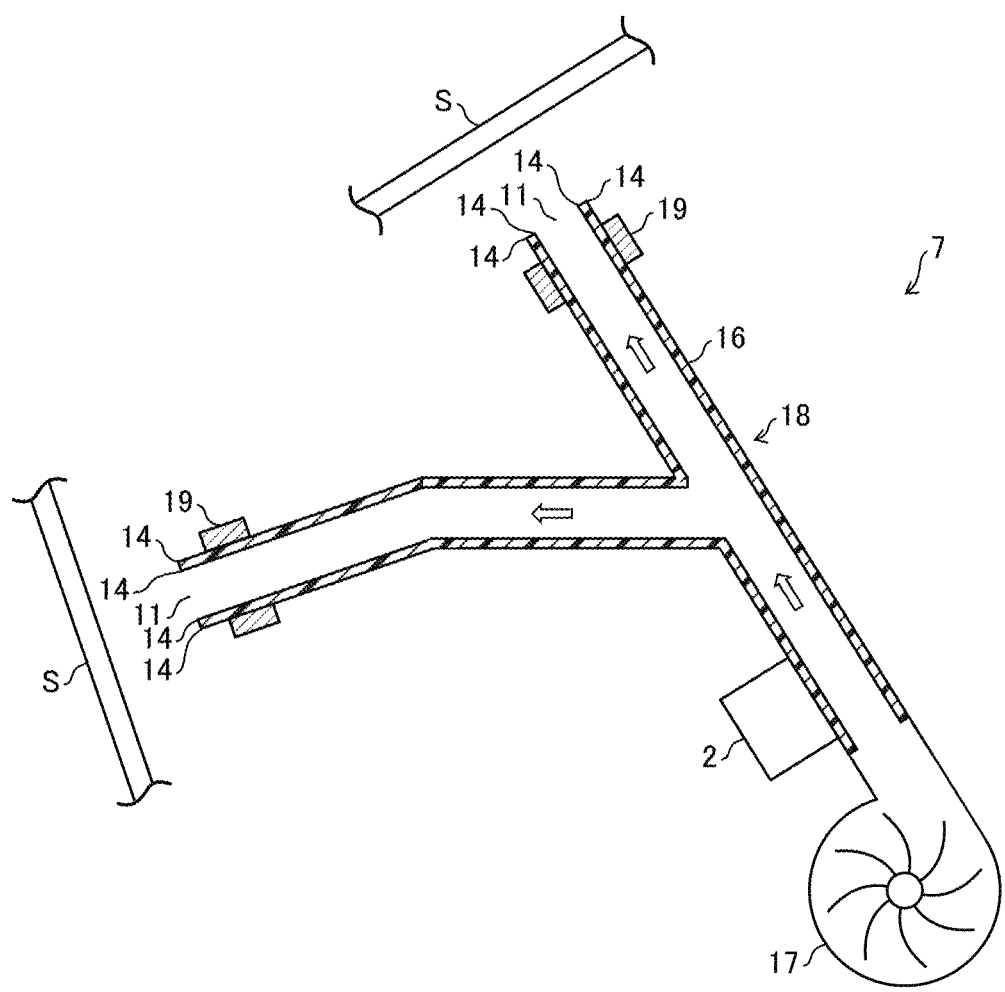
FIG. 13 is a cross-sectional view schematically illustrating a configuration of a vehicular static eliminating device in accordance with Embodiment 3 of the present invention.
Figure 14:
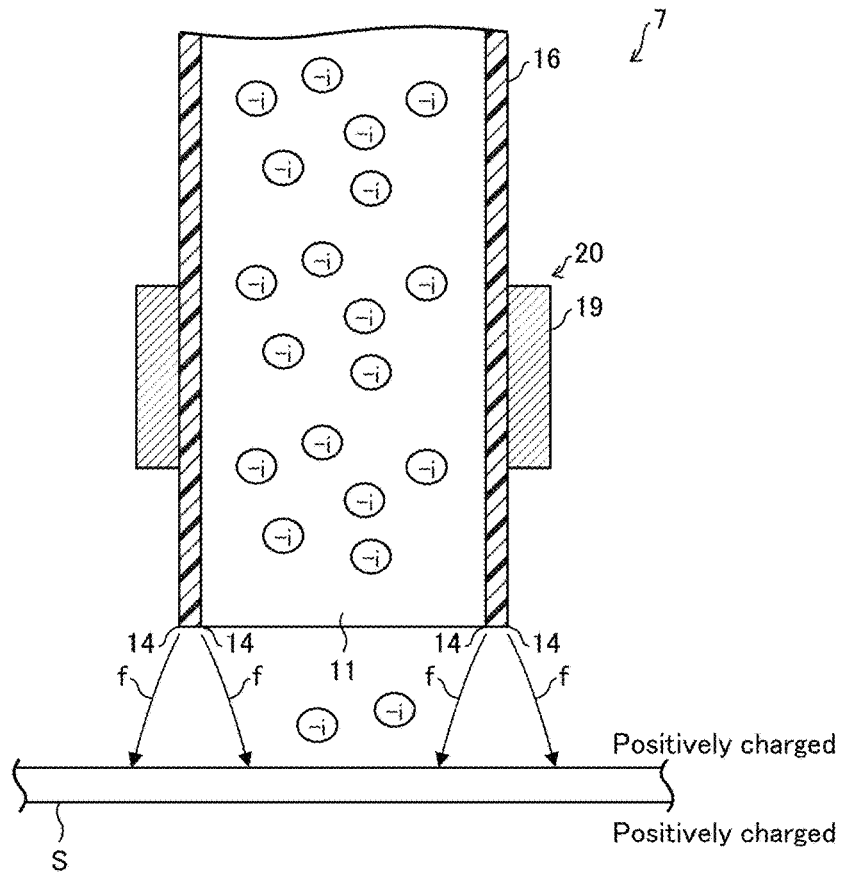
FIG. 14 is an enlarged view of an emission port part of a guide device of the vehicular static eliminating device illustrated in FIG. 13.

FIG. 13 is a cross-sectional view schematically illustrating a configuration of a vehicular static eliminating device 7 in accordance with Embodiment 3 of the present invention. FIG. 14 is an enlarged view of an emission port 11 part of a guide device 18 of the vehicular static eliminating device 7.

As illustrated in FIG. 13, the vehicular static eliminating device 7 is configured to include an electrostatic induction member 19 provided on a side of the vehicular static eliminating device 6 in accordance with Embodiment 2 on which side an end having the emission port 11 of the guide pipe 16 is provided. Specifically, the vehicular static eliminating device 7 includes the guide device 18 with which the guide device 15 is replaced and which includes the electrostatic induction member 19.

FIG. 13 illustrates a configuration in which the electrostatic induction member 19 is formed of an electrically conductive sheet metal ring (e.g., an aluminum cylinder) and is in contact with the guide pipe 16. Note, however, that the electrostatic induction member 19 can be in non-contact with the guide pipe 16 provided that a distance between the electrostatic induction member 19 and the guide pipe 16 allows negative electric charges having accumulated on the guide pipe 16 to move to the electrostatic induction member 19. As illustrated in FIG. 14, an opening located at an end of the guide pipe 16 serves as the emission port 11 of the guide device 18 and is provided with tip-shaped parts 14. The electrostatic induction member 19 is located upstream from the opening, located at the end of the guide pipe 16, in a direction in which negative ions flow.

With the configuration, positive electric charges whose polarity is reverse to charging polarity of the guide pipe 16 are attracted to an inner surface of the electrostatic induction member 19 which inner surface faces the guide pipe 16 in contact or non-contact with the guide pipe 16. Negative ions flowing through the guide pipe 16 are attracted to the emission port 11 side on which the electrostatic induction member 19 is provided. This makes it possible to bring about an effect of, without causing negative ions to remain in the guide pipe 16, efficiently guiding the negative ions to the emission port 11 and releasing the negative ions, the effect being similar to that brought about by an air blowing device 17.

Embodiment 3 shows, as an example, a configuration in which the electrostatic induction member 19 is provided in combination with the air blowing device 17. The electrostatic induction member 19 can alternatively be provided to the emission ports 11 of the guide member 13 of the guide device 10 of Embodiment 1, which guide device 10 includes no air blowing device 17.

As described earlier, the electrostatic induction member 19 is preferably provided as close as possible to an end of the guide pipe 16 at which end the emission port 11 is located. This makes it possible to release negative ions, attracted to the emission port 11, while giving momentum to the negative ions without causing the negative ions to remain in the guide pipe 16. Such an electrostatic induction member 19 can be formed of, for example, an electrically conductive sheet metal ring as described earlier. The electrostatic induction member 19 which is formed of the electrically conductive sheet metal ring can be attached to an end of the guide pipe 16, at which end the emission port 11 is located, by, for example, (i) integrally-molding the electrostatic induction member 19 with the end, (ii) pressing the electrostatic induction member 19 into the end, or (iii) adhering the electrostatic induction member 19 to the end with use of, for example, an electrically conductive adhesive. The electrostatic induction member 19 can alternatively be prepared by, for example, winding aluminum adhesive tape around the end.

The electrostatic induction member 19 can be configured to be (i) made of a coated film obtained by applying electrically conductive paint (discharge paint) to the emission port 11 side of the guide pipe 16 and (ii) provided with the tip-shaped parts 14 which cause corona discharge by a tip shape formed on the coated film. The electrically conductive paint can be, for example, metallic paint or carbon paint.

The electrostatic induction member 19 which is formed of the electrically conductive sheet metal ring is hereinafter referred to as an electrically conductive sheet metal ring 19.

Embodiment 4

A further embodiment of the present invention is described below with reference to FIGS. 15 and 16. Note that, for convenience, members having functions identical to those of the respective members described in Embodiments 1 to 3 are given respective identical reference signs, and a description of those members is omitted here.

Figure 15:
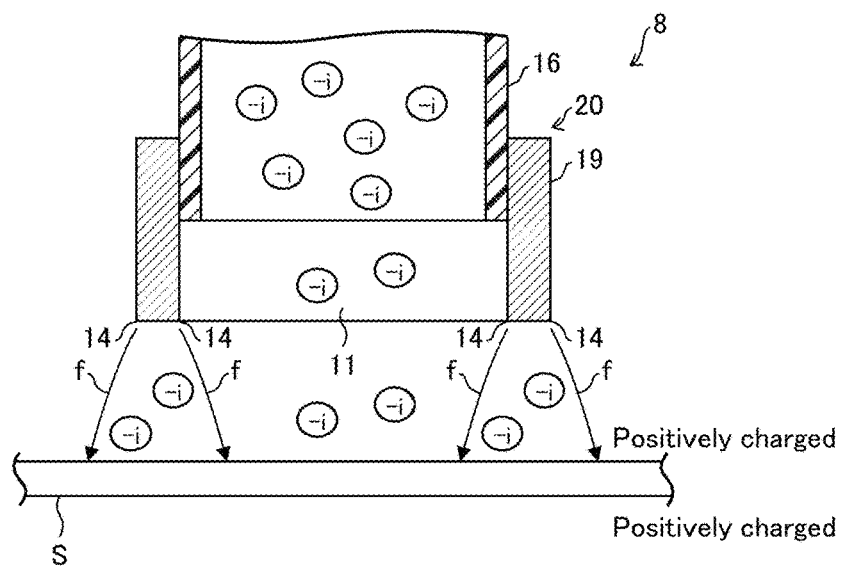
FIG. 15 is an enlarged view of an emission port part of a guide device of a vehicular static eliminating device in accordance with Embodiment 4 of the present invention.

FIG. 15 is an enlarged view of an emission port 11 part of a guide device 20 of a vehicular static eliminating device 8 in accordance with Embodiment 4 of the present invention. As illustrated in FIG. 15, an electrically conductive sheet metal ring 19 protrudes toward a static elimination target spot S beyond an opening located at an end of a guide pipe 16. Thus, an end of the electrically conductive sheet metal ring 19 which end thus protrudes serves as an emission port 11 of the guide device 20. Tip-shaped parts 14 are provided at the protruding end of the electrically conductive sheet metal ring 19 so as to be in proximity to the static elimination target spot S.

Negative electric charges of the guide pipe 16 are guided to the electrically conductive sheet metal ring 19, so that corona discharge is easily carried out from the tip-shaped parts 14 of the electrically conductive sheet metal ring 19 to the static elimination target spot S which is positively charged. This makes it possible to stably release negative ions, flowing through the guide pipe 16, with higher efficiency without causing the negative ions to remain in the guide pipe 16.

<Variation>

Figure 16:
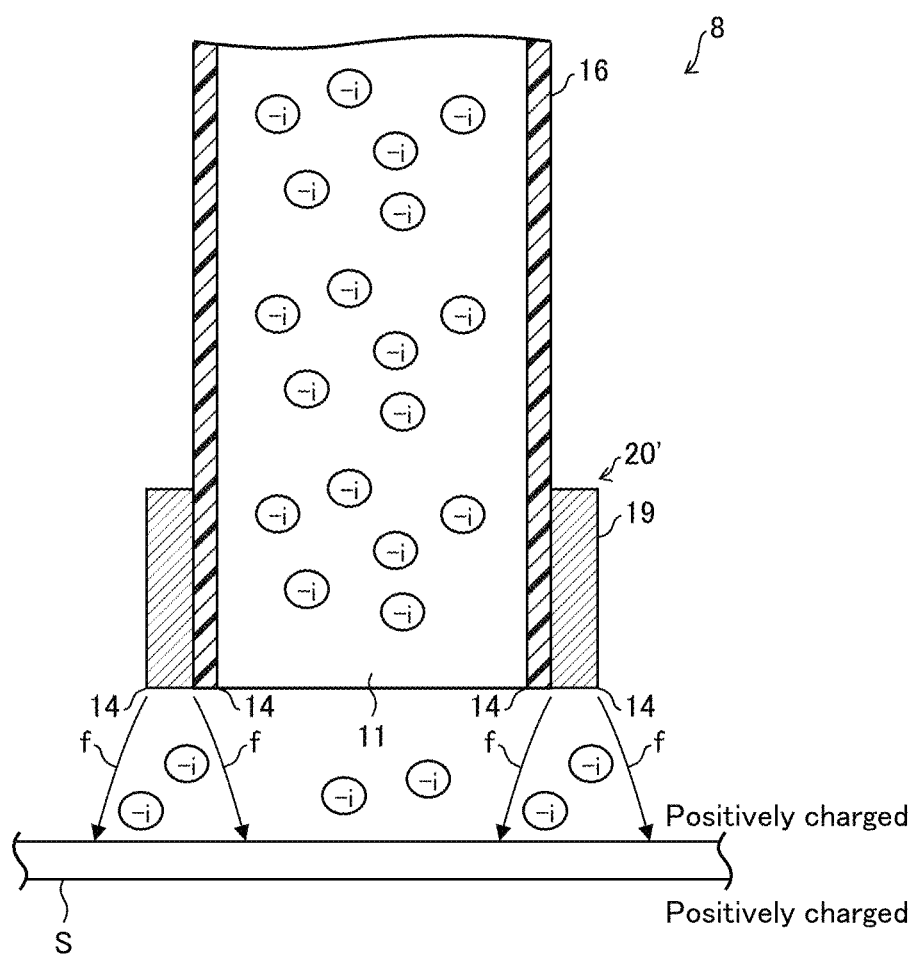
FIG. 16, which shows a variation of the vehicular static eliminating device illustrated in FIG. 14, is an enlarged view of an emission port part of a guide device.

FIG. 16, which shows a variation of the vehicular static eliminating device 8, is an enlarged view of an emission port 11 part of a guide device 20'. As illustrated in FIG. 16, an electrically conductive sheet metal ring 19 is provided so as to be flush with an opening located at an end of a guide pipe 16. Thus, an end of the electrically conductive sheet metal ring 19 which is provided so as to be flush with the opening located at the end of the guide pipe 16 is also provided with tip-shaped parts 14 for causing corona discharge. Since the tip-shaped parts 14 are in proximity to the static elimination target spot S, corona discharge is easily carried out from (i) an emission port 11 serving as the opening of the guide pipe 16 and (ii) the tip-shaped parts 14 of the electrically conductive sheet metal ring 19 to the static elimination target spot S which is positively charged. This makes it possible to stably release negative ions, flowing through the guide pipe 16, with higher efficiency without causing the negative ions to remain in the guide pipe 16.

Embodiment 5

A further embodiment of the present invention is described below with reference to FIG. 17. Note that, for convenience, members having functions identical to those of the respective members described in Embodiments 1 to 4 are given respective identical reference signs, and a description of those members is omitted here.

Figure 17:
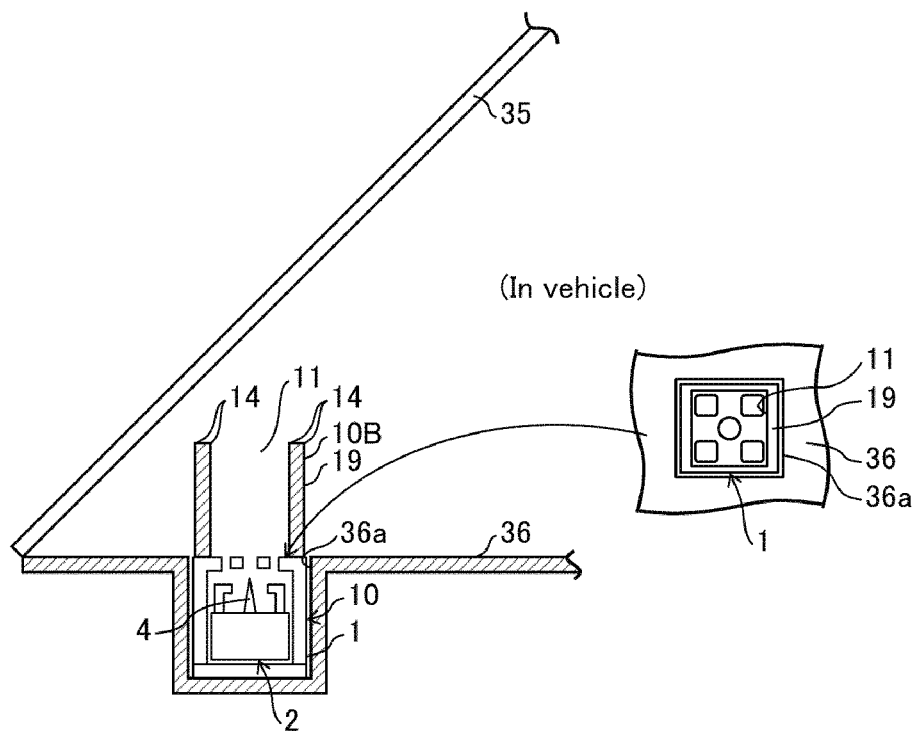
FIG. 17 is a view schematically illustrating a configuration of a vehicular static eliminating device in accordance with Embodiment 5 of the present invention and showing an example of how the vehicular static eliminating device is placed with respect to vehicle glass.

FIG. 17 is a view schematically illustrating a configuration of a vehicular static eliminating device 9 in accordance with Embodiment 5 of the present invention and showing an example of how the vehicular static eliminating device 9 is placed with respect to vehicle glass 35. As illustrated in FIG. 17, the vehicular static eliminating device 9 is configured to include an electrically conductive sheet metal ring 19 provided on a side of the vehicular static eliminating device 1 in accordance with Embodiment 1 on which side an end having the emission ports 11 of the guide member 13 is provided. According to the vehicular static eliminating device 9, the electrically conductive sheet metal ring 19 also functions as an extension guide member for extending an outlet of the guide member 13 to a static elimination target spot S. Also in this case, since the electrically conductive sheet metal ring 19 protrudes toward the static elimination target spot S beyond the front wall 13a of the guide member 13, an end of the electrically conductive sheet metal ring 19 which end thus protrudes serves as the emission ports 11 of the guide device. This forms the tip-shaped parts 14 for causing corona discharge.

With such a configuration, the emission ports 11 of the vehicular static eliminating device 9 can be easily made close to the static elimination target spot S. Specifically, by achieving commonality of structures except the electrically conductive sheet metal ring 19 and adjusting the length of the electrically conductive sheet metal ring 19 in accordance with a distance to the static elimination target spot S, it is possible to easily carry out corona discharge. It is also possible to reduce cost while effectively carrying out static elimination.

[Premises of Invention and Suitable Static Elimination Target Spot]

Figure 18:
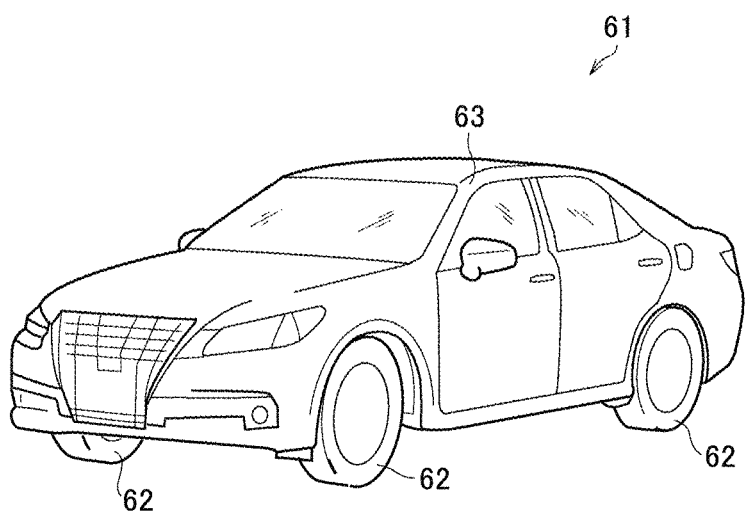
FIG. 18 is a view showing an example of a vehicle to which the present invention is applicable.

FIG. 18 is a view showing an example of a vehicle to which the present invention is applicable. In a vehicle 61 illustrated in FIG. 18, a wheel 62 is made of an insulating material (or a material having a low electric conductivity), such as rubber, so that a vehicle body 63 is insulated from a road surface. During travel of the vehicle 61, positive static electric charges are generated by electrical action that accompanies, for example, friction between the vehicle body 63 and an air flowing outside the vehicle or friction between the vehicle body 63 and an airflow flowing through an air duct. The positive static electric charges thus generated accumulate on the vehicle body 63. In a case where a power source such as an engine or a motor, a transmission, a suspension, or the like is driven, a plurality of members constituting such a device slide. Then, positive static electric charges are generated by electrical action that accompanies the sliding, and the positive static electric charges thus generated accumulate on the vehicle body 63. Furthermore, positive static electric charges are generated by (i) friction between the wheel 62 made of rubber and the road surface or (ii) electrical action caused by detachment of a surface of the wheel 62, which surface was in contact with the road surface, from the road surface due to rotation of the wheel 62. The positive static electric charges thus generated accumulate on the vehicle body 63. Alternatively, positive static electric charges may accumulate on the vehicle body 63 due to electricity of an electrical apparatus provided in the vehicle 61 or of an electrical apparatus such as a transmission line provided outside the vehicle 61.

As a result, those positive static electric charges also accumulate on a resin panel and glass each having a low electric conductivity and on a vehicle body wall and a vehicle body panel each of which is made of a metallic material having a relatively high electric conductivity. Furthermore, since an intake air passage wall which defines an intake passage of an air intake device of a driving force generating device is made of a resin material, the intake air passage wall is easily positively charged.

Air is ordinarily positively charged. Thus, the air and the vehicle body 63 on which positive static electric charges accumulate repel each other. Similarly, intake air and the intake passage of the air intake device of the driving force generating device on which intake passage positive static electric charges accumulate also repel each other.

Figure 19:
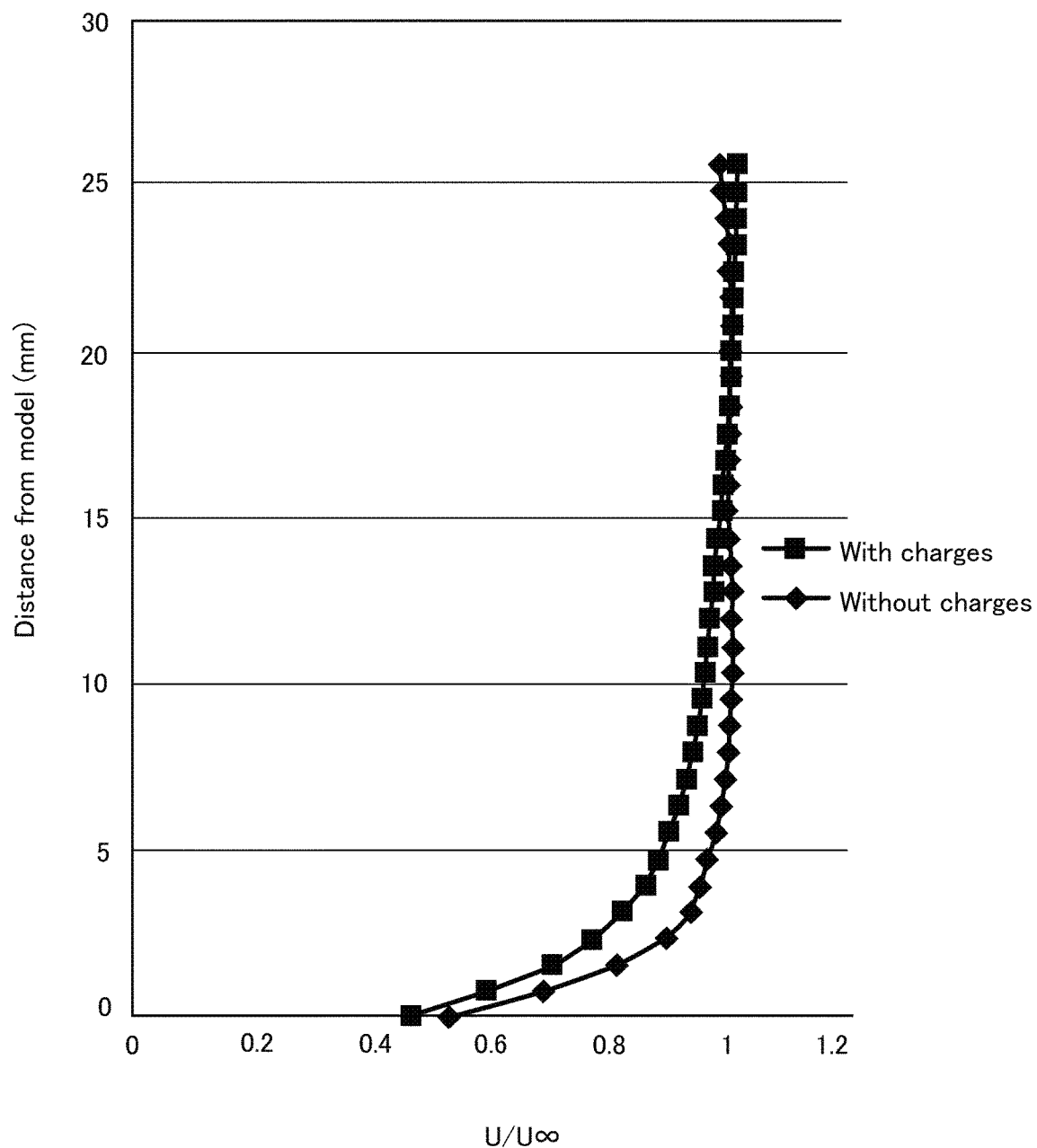
FIG. 19 is graphs showing measurement results of flow velocity distribution in a direction perpendicular to a positively charged surface of a model vehicle and flow velocity distribution in a direction perpendicular to an uncharged surface of the model vehicle.

FIG. 19 is graphs showing measurement results of flow velocity distribution in a direction perpendicular to a positively charged surface of a model vehicle and flow velocity distribution in a direction perpendicular to an uncharged surface of the model vehicle. In FIG. 19, the vertical axis shows a distance from the surface of the model vehicle, and the horizontal axis shows a ratio (U/U∞) of (a) a flow velocity U measured for each distance from the model vehicle to (b) a flow velocity U∞ of air flowing on the surface of the model vehicle. Square dots show measured values of a flow velocity of the air flowing on the positively charged surface of the model vehicle, and rhombus dots show measured values of a flow velocity of the air flowing on the uncharged surface of the model vehicle.

As shown in FIG. 19, a thickness of a boundary layer (i.e., a distance from the surface of model vehicle at which surface the ratio U/U∞ is substantially 1) of a case where the surface of the model vehicle is positively charged is larger than that of a case where the surface of the model vehicle is not positively charged. This means that an airflow is separated further away from the positively charged surface of the model vehicle as compared with a case where the surface of the model vehicle is not positively charged. This seems to be because an airflow is basically positively charged as described earlier, and thus the positively charged airflow and the positively charged surface of the model vehicle repel each other, so the airflow is separated further away from the surface of the model vehicle.

Note that a positively charged surface and an uncharged surface of the intake air passage wall which defines the intake passage of the air intake device of the driving force generating device also bring about results similar to those shown in FIG. 19.

Thus, an influence by positive static electric charges can be effectively reduced by eliminating static electricity from such a point at which air flowing along a surface of an outer wall of the vehicle body is easily separated from the surface and/or a point at which intake air of the driving force generating device is easily separated from a surface of the intake air passage wall.

An airflow flowing along a surface of the vehicle body 63 has a tendency to be separated from the surface of the vehicle body 63 at, for example, such specific points as described below. Specifically, when the vehicle body 63 is seen from the front side, the airflow is separated from the surface of the vehicle body 63 mainly at a point where an outer surface of the vehicle body 63 is inwardly bent. More specifically, on both right and left sides of the vehicle body 63, the airflow is separated from the surface of the vehicle body 63 at points where the outer surface is bent so that the width of the vehicle is narrowed. In the hood or a roof, the airflow is separated from the surface of the vehicle body 63 at a point where the outer surface is downwardly bent. In a part exposed on a lower surface of the vehicle body, such as an undercover, the airflow is separated from the surface of the vehicle body 63 at a bent part located between (a) a part of the vehicle which part is inclined so that the vehicle has a lower height as the vehicle extends further backward and (b) a part of the vehicle which part is horizontal to a road surface or at a bent part located between (c) a part of the vehicle which part is horizontal to a road surface and (d) a part of the vehicle which part is inclined so that the vehicle has a higher height as the vehicle extends further backward. The airflow also has a tendency to be separated from the surface of the vehicle body 63 at a point partially protruding to an outside of the vehicle body 63 or a point having a step. An airflow flowing along a surface of the vehicle body 63 is thus separated from the surface of the vehicle body 63 at such specific points as described earlier.

Aspects of the present invention can also be expressed as follows:

In the case of a vehicle body, a back wall surface of a part of a body outer wall, the part having a shape which makes it easy for an airflow flowing along a surface of the body outer wall to be separated from the surface of the body outer wall, is regarded as a static elimination target spot S and static electricity is eliminated from the static elimination target spot S. Alternatively, the static elimination target spot S is negatively charged. This makes it possible to effectively restrain the airflow from being separated from the surface of the body outer wall.

In the case of an intake air passage wall of a driving force generating device, an outer wall surface of a part of an intake air passage wall made of a resin, the part having a shape which makes it easy for intake air to be separated from an inner surface of the intake air passage wall, is regarded as a static elimination target spot S and static electricity is eliminated from the static elimination target spot S. This makes it possible to effectively restrain a flow of intake air from being separated from the inner surface of the intake air passage wall, and consequently to take in intake air with higher efficiency. For example, (a) and (b) of FIG. 20 are each an explanatory view illustrating (i) an intake air introduction pipe 66 to an air cleaner, which is a part of an air intake device of a driving force generating device of a vehicle and (ii) the vehicular static eliminating device 1 illustrated in FIG. 1 and provided near the intake air introduction pipe 66 so as to be in proximity to the intake air introduction pipe 66. In (a) and (b) of FIG. 20, a place where a flow of intake air is separated from an inner surface of an intake air passage wall of the intake air introduction pipe 66 is indicated by an ellipse (dotted and dashed line). The vehicular static eliminating device 1 is provided in proximity to the intake air introduction pipe 66 so as to release negative ions to an outer wall of an intake air passage near the ellipse. In (a) and (b) of FIG. 20, the intake air introduction pipe 66 is shown by a perspective view, whereas the vehicular static eliminating device 1 is shown by a cross-sectional view for convenience.

FIG. 18 shows, as an example of a vehicle to be provided with any of the vehicular static eliminating devices 1 and 6 to 9 described earlier, a vehicle whose wheel 62 is made of an insulating material such as rubber and whose vehicle body 63 is insulated from a road surface. The vehicle can alternatively be a train whose iron wheel runs on a rail. In short, it is needless to say that the vehicle includes a vehicle on which positive static electric charges accumulate by, for example, an external factor including travel of a vehicle body.

Aspects of the present invention can also be expressed as follows:

In a first aspect of the present invention, a vehicular static eliminating device is (i) provided in a vehicle on which positive static electric charges accumulate by, for example, an external factor including travel of a vehicle body which is insulated from a road surface and (ii) configured to eliminate static electricity from a static elimination target spot in the vehicle, the static elimination target spot being predetermined and positively charged, or to negatively charge the static elimination target spot, the vehicular static eliminating device including: a negative ion generating section; and a guide device configured to guide negative ions generated by the negative ion generating section, and release the negative ions from an emission port to the static elimination target spot, the guide device including: a guide member defining a passage through which to guide the negative ions, the guide member being made of a resin which is easily negatively charged in a triboelectric series; and a tip-shaped part configured to discharge, by corona discharge, negative electric charges, which have accumulated on the guide member, to the static elimination target spot, the tip-shaped part being provided in a part defining the emission port and in proximity to the static elimination target spot.

In a second aspect of the present invention, a vehicular static eliminating device can be configured such that, in the first aspect of the present invention, the static elimination target spot is a back wall surface of a part of a body outer wall of the vehicle, the part having a shape which makes it easy for air flowing along a surface of the body outer wall to be separated from the surface.

In a third aspect of the present invention, a vehicular static eliminating device can be configured such that, in the first aspect of the present invention, the static elimination target spot is an outer wall surface of a part of an intake air passage wall, made of resin, of a driving force generating device of the vehicle, the part having a shape which makes it easy for intake air to be separated from an inner surface of the intake air passage wall.

In a fourth aspect of the present invention, a vehicular static eliminating device can be configured such that, in any one of the first through third aspects of the present invention, the guide device includes an air blowing device configured to blow the negative ions to the emission port.

In a fifth aspect of the present invention, a vehicular static eliminating device can be configured such that, in any one of the first through fourth aspects of the present invention, the guide device includes an electrostatic induction member provided on a side of the guide member on which side an outlet for the negative ions is provided.

In a sixth aspect of the present invention, a vehicular static eliminating device can be configured such that, in the fifth aspect of the present invention, the electrostatic induction member has a static elimination target spot side end which is located so as to be at least flush with the outlet of the guide member or closer to the static elimination target spot than the outlet of the guide member and which is provided with the tip-shaped part for causing the corona discharge.

In a seventh aspect of the present invention, a vehicular static eliminating device can be configured such that, in the fifth or sixth aspect of the present invention, the electrostatic induction member is formed of an electrically conductive sheet metal ring, and the electrostatic induction member is integrally-molded with, pressed into, or adhered to the outlet of the guide member.

In an eighth aspect of the present invention, a vehicular static eliminating device can be configured such that, in the fifth aspect of the present invention, the electrically conductive sheet metal ring also functions as an extension guide member for extending the outlet of the guide member to the static elimination target spot.

In a ninth aspect of the present invention, a vehicular static eliminating device can be configured such that, in the sixth aspect of the present invention, the electrostatic induction member is (i) made of a coated film obtained by applying electrically conductive paint to the outlet of the guide member and (ii) provided with the tip-shaped part for causing the corona discharge by a tip shape formed on the coated film.

In a tenth aspect of the present invention, a vehicular static eliminating device can be configured such that, in any one of the first through ninth aspects of the present invention, the shortest distance between a center of the emission port of the guide device and the static elimination target spot is not more than 100 mm.

In other words, in a tenth aspect of the present invention, a vehicular static eliminating device can be configured such that, in any one of the first through ninth aspects of the present invention, the corona discharge is carried out with respect to the static elimination target spot which is spaced the shortest distance of 100 mm away from a center of the emission port of the guide device.

In an eleventh aspect of the present invention, a vehicular static eliminating device can be configured such that, in the tenth aspect of the present invention, the shortest distance between the center of the emission port of the guide device and the static elimination target spot is 20 mm.

In other words, in an eleventh aspect of the present invention, a vehicular static eliminating device can be configured such that, in the tenth aspect of the present invention, a static elimination effect on the static elimination target spot which is spaced the shortest distance of 20 mm away from the center of the emission port of the guide device reaches a peak.

In a twelfth aspect of the present invention, a vehicle includes a vehicular static eliminating device recited in any one of the first through eleventh aspects of the present invention.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 6, 7, 8, 9 Vehicular static eliminating device
2 Negative ion generating device (negative ion generating section)
10, 15, 18, 20, 20' Guide device
11 Emission port
13 Guide member
14 Tip-shaped part
16 Guide pipe (guide member)
17 Air blowing device
19 Electrostatic induction member, electrically conductive sheet metal ring
31 Front pillar
32 Inner panel
35 Vehicle glass
36 Placement surface
36a Recess
37 Windshield
38 Dashboard
39 Side glass
40 Side door
61 Vehicle
62 Wheel
63 Vehicle body
66 Intake air introduction pipe
S Static elimination target spot

The invention claimed is:

1. A vehicular static eliminating device (i) provided in a vehicle on which positive static electric charges accumulate and (ii) configured to eliminate static electricity from a static elimination target spot in the vehicle, the static elimination target spot being predetermined and positively charged, or to negatively charge the static elimination target spot,
said vehicular static eliminating device comprising:
a negative ion generating section; and
a guide device configured to guide negative ions generated by the negative ion generating section, and release the negative ions from an emission port to the static elimination target spot,
the guide device including:
a guide member defining a passage through which to guide the negative ions, the guide member being made of a resin which is negatively charged in a triboelectric series; and
a tip-shaped part configured to discharge, by corona discharge, negative electric charges, which have accumulated on the guide member, to the static elimination target spot, the tip-shaped part being provided in a part defining the emission port and in proximity to the static elimination target spot.

2. The vehicular static eliminating device as set forth in claim 1, wherein the static elimination target spot is a back wall surface of a part of a body outer wall of the vehicle, the part having a shape which allows for air flowing along a surface of the body outer wall to be separated from the surface.

3. The vehicular static eliminating device as set forth in claim 1, wherein the static elimination target spot is an outer wall surface of a part of an intake air passage wall, made of resin, of a driving force generating device of the vehicle, the part having a shape which allows for intake air to be separated from an inner surface of the intake air passage wall.

4. The vehicular static eliminating device as set forth in claim 1, wherein the guide device includes an air blowing device configured to blow the negative ions to the emission port.

5. The vehicular static eliminating device as set forth in claim 1, wherein the guide device includes an electrostatic induction member provided on a side of the guide member on which side an outlet for the negative ions is provided.

6. The vehicular static eliminating device as set forth in claim 5, wherein the electrostatic induction member has a static elimination target spot side end which is located so as to be at least flush with the outlet of the guide member or closer to the static elimination target spot than the outlet of the guide member and which is provided with the tip-shaped part for causing the corona discharge.

7. The vehicular static eliminating device as set forth in claim 6, wherein the electrostatic induction member is (i) made of a coated film obtained by applying electrically conductive paint to the outlet of the guide member and (ii) provided with the tip-shaped part for causing the corona discharge by a tip shape formed on the coated film.

8. The vehicular static eliminating device as set forth in claim 5, wherein the electrostatic induction member is formed of an electrically conductive sheet metal ring, and the electrostatic induction member is integrally-molded with, pressed into, or adhered to the outlet of the guide member.

9. The vehicular static eliminating device as set forth in claim 8, wherein the electrically conductive sheet metal ring also functions as an extension guide member for extending the outlet of the guide member to the static elimination target spot.

10. The vehicular static eliminating device as set forth in claim 1, wherein the shortest distance between a center of the emission port of the guide device and the static elimination target spot is not more than 100 mm.

11. The vehicular static eliminating device as set forth in claim 10, wherein the shortest distance between the center of the emission port of the guide device and the static elimination target spot is 20 mm.

12. A vehicle comprising a vehicular static eliminating device recited in claim 1.

* * * * *